March 16, 1926.

C. MASS 1,576,982

LUBRICANT DISPENSING APPARATUS

Filed Feb. 20, 1924

INVENTOR
CARL MASS.
BY
ATTORNEY

Patented Mar. 16, 1926.

1,576,982

UNITED STATES PATENT OFFICE.

CARL MASS, OF NEWARK, NEW JERSEY.

LUBRICANT-DISPENSING APPARATUS.

Application filed February 20, 1924. Serial No. 694,147.

*To all whom it may concern:*

Be it known that I, CARL MASS, a citizen of the United States, residing at Newark, in the county of Essex and State of New Jersey, have invented new and useful Improvements in Lubricant-Dispensing Apparatus, of which the following is a specification.

This invention relates to improvements in lubricant dispensing pumps, and more particularly to a pump which will comprise a battery of separate storage tanks in which several grades of lubricant may be contained, and a single fluid operated means for forcing the several pistons in the tanks in an upwardly direction, to dispense the desired grade of lubricant through suitable flexible hose lines.

An object of the invention is to provide a suitable construction of lubricant dispensing pump, which will utilize water pressure from a common source to force the desired grade of lubricant from any one of several lubricant storage tanks.

A further object of the invention is to provide a battery of lubricant storage tanks with a common fluid pressure operated means for dispensing the lubricant from said tanks, and means for automatically relieving the pressure in the tanks when the supply of lubricant is exhausted.

Other objects will appear as the description proceeds.

In the accompanying drawings which constitute a part of my application,

Like characters of reference are used throughout the following specification and the accompanying drawings to designate corresponding parts.

Figure 1:
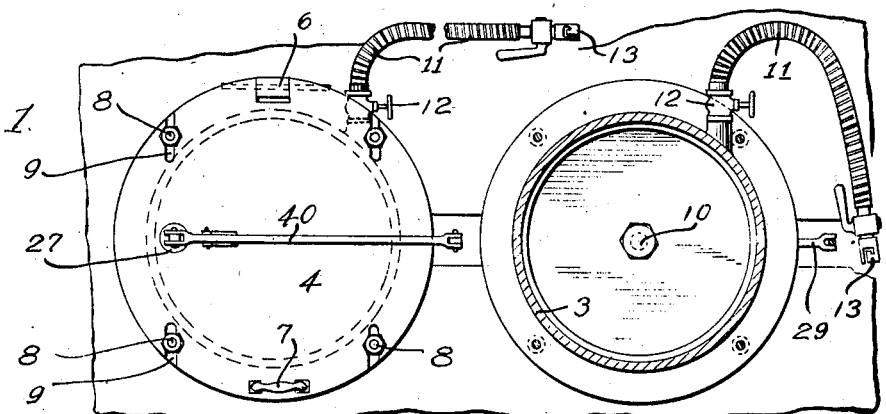
Figure 1 is a plan view of a battery of two lubricant storage tanks.
Figure 2:
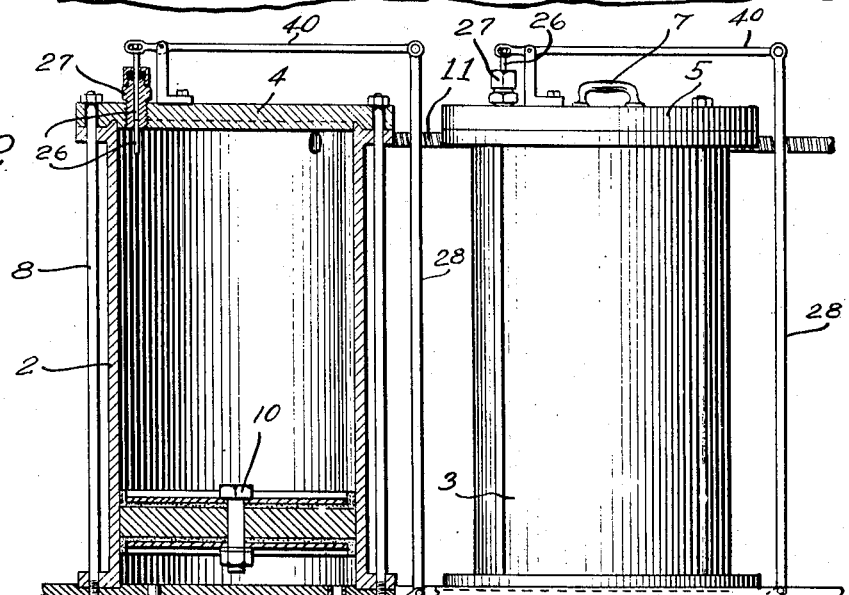
Figure 2 is a side elevation, showing one of the lubricant storage tanks in section, and also showing the fluid pressure mechanism.
Figure 3:
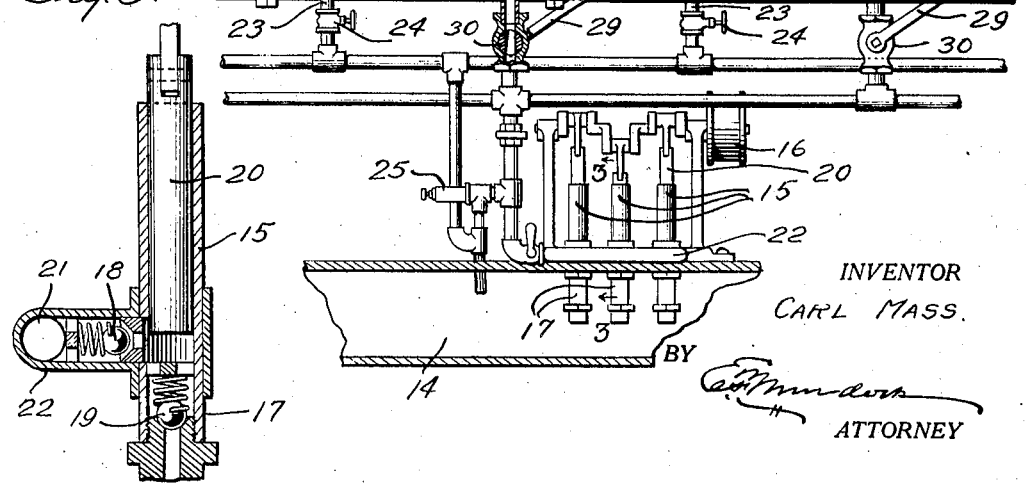
Figure 3 is a sectional view taken through one of the fluid pressure pumps.

My lubricant dispensing pump comprises a supporting base 1, on which are mounted two lubricant supply tanks 2 and 3, which are provided with suitable interlocking tops 4 and 5, which are hinged at 6 to the said tanks. The tops 4 and 5 are further provided with handles 7 for lifting the same, and are securely held in closed position by means of the locking rods 8, which extend through the base 1, and the several notches 9 in the said tops.

A piston 10 is slidably positioned within each of the cylindrical tanks 2 and 3, and carries a suitable leak-proof packing. A flexible hose 11 is also attached to each of the tanks 2 and 3, adjacent their upper ends and are provided at their inner ends with the valves or cut-offs 12 and at their outer ends with the bayonet or other readily detachable connectors 13, for attaching to the several lubricant cups on the machine, when filling.

A fluid reservoir 14 is positioned below or adjacent the tanks 2 and 3, and has mounted thereon one or more fluid pressure pumps 15, which are adapted to be continuously operated from a suitable source of power (not shown), which may be connected to the driving pulley 16. These pumps 15 are provided with the downwardly directed extensions 17, which will have their lower ends submerged in the fluid in the tank or reservoir 14, and are further provided with the resiliently tensioned oppositely seating valves 18 and 19, which serve to check the fluid from passing back through the said pumps. Suitable pistons 20 will be positioned within the several pump cylinders 15. An outlet 21 connects each pump with a manifold 22, which in turn will be connected through suitable pipes to the lower ends of the tanks 2 and 3, below the pistons 10.

The tanks 2 and 3 are also provided with drain pipes 23, which are interconnected, and terminate within the fluid tank 14, so that when the valves 24 are opened, the fluid will empty from below the pistons 10 in the cylinders or tanks 2 and 3, into the said tank 14. A relief valve 25 connects the inlet and discharge pipes from the manifold to the tanks 2 and 3, so that the pressure of the constantly operating pumps will not be excessive.

A stem 26 is slidably mounted through a suitable packing 27 in the top of each tank 2 and 3, and is loosely connected with a pivoted lever 27, which in turn connects with a rod 40, having its lower end attached to the handle 29 of a cut-off valve 30 in the fluid inlet pipe, and causes the same to cut-off when the piston 10 reaches a sufficient height to engage the said stem. This action will automatically cut off the pressure from the pumps, and will also indicate that the supply of lubricant in the supply tanks is exhausted.

While I have described my preferred form of construction of my lubricant dispensing tanks, it will be understood that I do not intend to limit myself to the specific construction described, as many minor changes in detail of construction may be resorted to without departure from the spirit of the invention.

Having thus described my invention, what I claim as new and desire to secure by Letters Patent of the United States is:

1. A lubricant dispensing apparatus comprising a tank, a piston operable therein, a source of fluid supply, a pump connected therewith and having connection with tank, means connecting said tank with said source of fluid supply, and piston operated means for automatically cutting off the fluid from said pump when said piston is moved a predetermined degree.

2. A lubricant dispensing apparatus comprising a battery of lubricant containing tanks, pistons operable therein, a common source of fluid supply, a common pump connected therewith and having connection with said tanks, interconnected valved drain lines connecting said tanks with said source of fluid supply, a pressure relief valve for said pump, and means for automatically cutting off the supply of fluid from said pump, when said piston is raised a predetermined height.

3. A lubricant dispensing apparatus comprising a battery of lubricant containing tanks, pistons operable therein, valved discharge lines from said tanks, a common fluid supply and fluid pump for operating said pistons, interconnected valved drain lines connecting said tanks and fluid supply, and a slidable stem extending through the tops of said tanks, and having connection with a pressure cut off valve, whereby the same may be closed when said pistons reach a predetermined height.

4. A lubricant dispensing apparatus comprising a lubricant containing tank, a removable cover therefor, a piston slidable in said tank, a source of fluid supply, a fluid pump for operating said piston, means for operating said pump, a relief valve for said pump, discharge means for permitting the return of the fluid from said tank to said source of fluid, a packing extending through said tank, and means extending through said packing for automatically cutting off the fluid pressure to the tank when said piston engages said last mentioned means.

5. A lubricant dispensing apparatus comprising the subject matter as claimed in claim 4, and means for preventing the accidental back flowing of the fluid under pressure from the tank to the source of fluid supply.

6. An apparatus as characterized comprising a plurality of dispensing cylinders; a plurality of distributing means, one attached to each of said cylinders; power-driven means for ejecting the contents of said cylinders therefrom at will; and means connected with each of said cylinders for indicating the exhaustion of the contents dispensed therefrom, by control of said power driven means.

CARL MASS.